United States Patent [19]

Shim et al.

[11] 3,897,478

[45] July 29, 1975

[54] CONTINUOUS PROCESS FOR THE MANUFACTURE OF ALKYL CHRYSANTHEMATE ESTERS

[75] Inventors: Kyung S. Shim; Donald J. Martin, both of Irvington, N.Y.

[73] Assignee: Stauffer Chemical Company, New York, N.Y.

[22] Filed: May 21, 1970

[21] Appl. No.: 39,202

[52] U.S. Cl. .............................................. 260/468 H
[51] Int. Cl. ...................... C07c 67/00; C07c 64/174
[58] Field of Search ................. 260/468 P, 514, 249

[56] References Cited
UNITED STATES PATENTS
2,691,650  10/1954  Hammond .......................... 260/239

OTHER PUBLICATIONS
Kirmse Carbene Chemistry, 12, 95–99, (1964).
Fieser et al., Reagents for Organic Synthesis, pp. 367–368, (1967).

Primary Examiner—Robert Gerstl

[57] ABSTRACT

A continuous process for the preparation of the $C_1$-$C_{10}$ alkyl chrysanthemate esters is disclosed. The use of this novel process is found to be far more rapid as well as less hazardous than the batch-type process presently employed for the preparation of alkyl chrysanthemate esters while also producing the latter esters in yields which are substantially greater than those attainable by means of this batch-type process.

18 Claims, 1 Drawing Figure

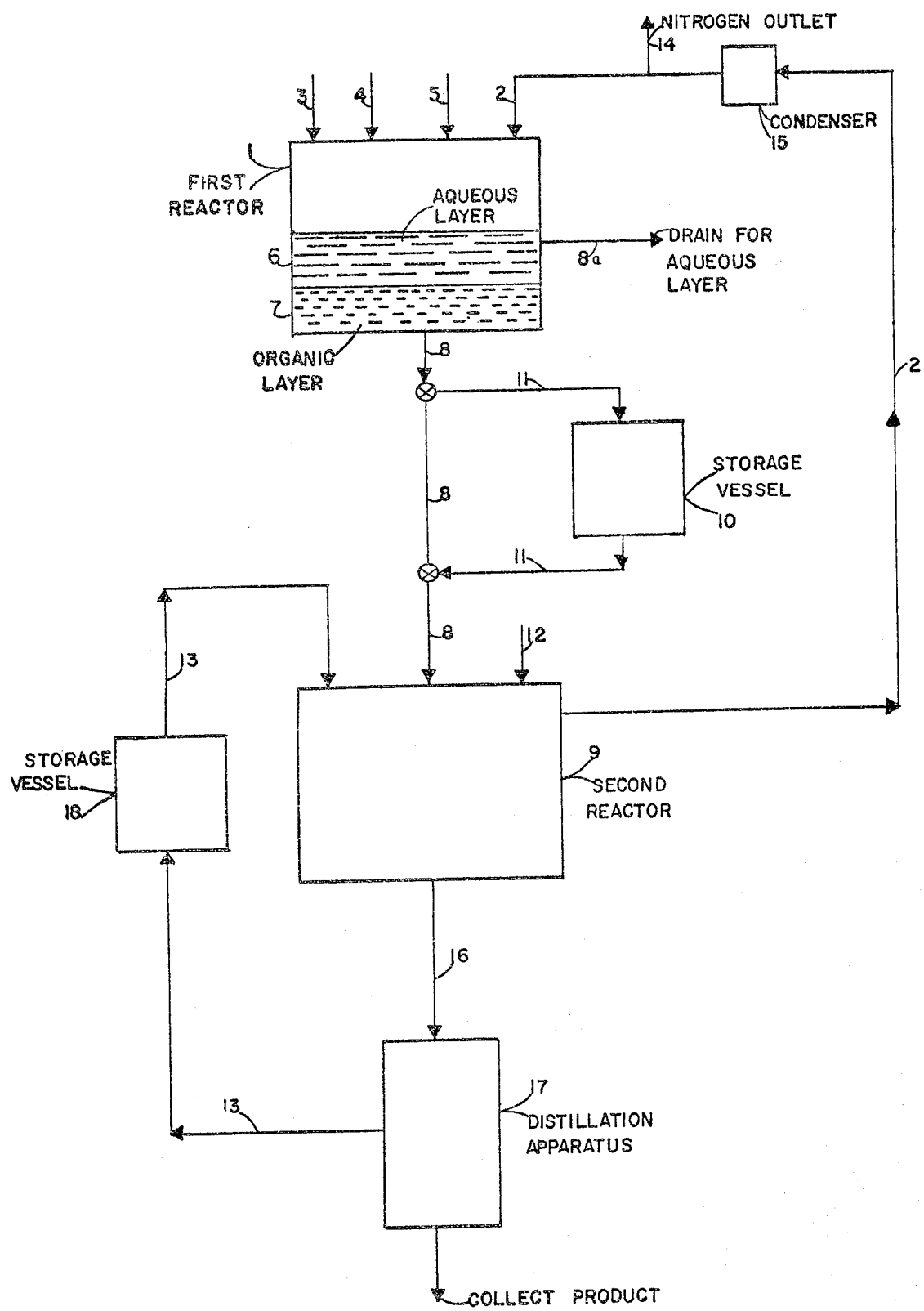

CONTINUOUS PROCESS FOR THE MANUFACTURE OF ALKYL CHRYSANTHEMATE ESTERS

BACKGROUND OF THE INVENTION

The alkyl chrysanthemate esters, particularly ethyl chrysanthemate, are chemical intermediates which are especially useful for the preparation of household insecticides. They have, heretofore, been manufactured on a commercial basis by means of a batch process which, in the case of ethyl chrysanthemate, requires more than 16 hours to complete and has a limited output in a rather low yield of only about 60 percent.

Thus, in the commercially utilized batch-type process for the preparation of ethyl chrysanthemate, ethyl diazoacetate is first prepared by means of the reaction of glycine ethyl esterHCl with sodium nitrite in the presence of an acid catalyst. Any moisture or acidic material which may be present in the organic layer which contains the ethyl diazoacetate must then be removed by treating this organic layer with soda ash for a period of about 18 hours.

The dried ethyl diazoester is then reacted with 2,5-dimethyl-2,4-hexadiene to yield a crude product which is distilled under reduced pressure to afford an average yield of about 60 percent of ethyl ester of chrysanthemumic acid.

In addition to being time consuming, the necessity in the above described reaction procedure for the repeated handling of ethyl diazoacetate, makes this an extremely hazardous technique since, as is known to those skilled in the art, this reagent is explosive when exposed to heat and it is a dangerous skin irritant as well as a possible carcinogen. The difficulties inherent in this batch process are well documented in the literature such, for example, as on Page 38 of the Jan. 24, 1953 issue of Chemical Week which describes the manufacture of ethyl chrysanthemate behind a concrete barrier utilizing remote control handling techniques. Another example of a batch-type process for preparing ethyl chrysanthemate is the method described in British Patent No. 740,014.

It is, therefore, the prime object of this invention to provide a continuous process for the manufacture of the alkyl esters of chrysanthemumic acid, and particularly ethyl chrysanthemate, which will be capable of producing these useful insecticidal intermediates in substantially higher yields, over a relatively shorter reaction period and with far less of a hazard to the operator than is now possible by the use of the conventional batch-type reaction process. Various other objects and advantages of this invention will be apparent from the disclosure which follows hereinafter.

TECHNICAL DISCLOSURE OF THE INVENTION

It has now been discovered that the $C_1$-$C_{10}$ alkyl esters of chrysanthemumic acid, i.e., the $C_1$-$C_{10}$ alkyl chrysanthemates, can be obtained in high yields of about 80 percent and in the relatively short reaction time of only about 15 minutes by means of a continuous reaction technique which minimizes explosive hazards and which is free of any need for contact with the corrosive and possibly carcinogenic alkyl diazoester intermediate. This novel process thereby eliminates all of the various drawbacks inherent in the batch-type process presently employed for the manufacture of this useful material.

The novel process of this invention comprises two chemical reactions which are carried out as a continuous process. The first of these reactions involves the preparation of a $C_1$-$C_{10}$ alkyl diazoacetate by means of the reaction between an alkali metal nitrite, such as potassium and preferably sodium nitrite, and an acid salt, such as hydrogen chloride salt, of a $C_1$-$C_{10}$ alkyl ester of glycine in the presence of an acid catalyst such as sulfuric or phosphoric acid, but preferably a mixture of acetic acid and sodium acetate, using a water immiscible organic solvent such as a saturated hydrocarbon or a chlorinated hydrocarbon including, for example, methylene chloride, chloroform or carbon tetrachloride and, preferably, ethylene dichloride as the solvent medium wherein the resulting alkyl diazoacetate dissolves as it is formed.

For purposes of convenience, the process of this invention will hereinafter be described, within this disclosure, with respect to the preferred embodiment thereof involving the preparation of ethyl chrysanthemate whereby the first reaction in the process comprises the use of the hydrogen chloride salt of the ethyl ester of glycine, sodium nitrite, ethylene dichloride and a mixture of sodium acetate and acetic acid as the acid catalyst.

Thus, it will be understood that the process hereinafter described can be used for the preparation of any of the $C_1$-$C_{10}$ alkyl esters of chrysanthemumic acid simply by utilizing the appropriate $C_1$-$C_{10}$ alkyl ester of glycine in the first stage of the reaction. The alkyl groups of these glycine esters may be either branched or straight chained in their configuration and may, for example, include the methyl, n-propyl, iso-propyl, n-butyl, isobutyl, tert-butyl, pentyl, hexyl, heptyl, octyl, nonyl and decyl esters of glycine and all of their various isomers in addition to the ethyl ester.

The above described reaction which comprises the first step in the process of this invention is represented by the following equation:

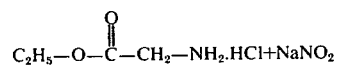

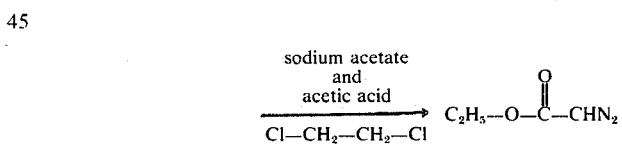

The second reaction utilized in the continuous process of this invention involves the coupling of the $C_1$-$C_{10}$ alkyl diazoacetate intermediate with 2,5-dimethylhexadiene-2,4 in a heated reactor in the presence of transition metal catalyst such as a copper bronze catalyst. For purposes of convenience, this reaction will hereinafter be described, within this disclosure, with respect to the preferred embodiment thereof comprising the use of copper bronze as the transition metal catalyst.

The novel process of this invention will now be given in greater detail. In describing this process, reference will be made to FIG. 1 in the appended drawing which depicts a flow diagram illustrating the various phases of a preferred embodiment of this process. It is to be understood, however, that this flow diagram is only representative and that the process of this invention may be altered in many respects by those skilled in the art while remaining within the intended scope of the invention.

Referring now to FIG. I, reactor 1, which is equipped with means for agitation and is preferably jacketed for receiving water or some other suitable coolant, receives the ethylene dichloride solvent through line 2. After this solvent is cooled to a temperature in the range of from 0° to 20°C., an aqueous solution of the hydrogen chloride salt of the ethyl ester of glycine is introduced through line 3 and a solution of sodium acetate and acetic acid, either individually or as a solution of the salt in the acid, are introduced through line 4. While maintaining the resulting mixture under moderate agitation, an aqueous solution of sodium nitrite is slowly introduced through line 5 preferably at a time simultaneous with the introduction of the glycine ester. The temperature of the resulting reaction is maintained at a level of less than about 20°C., and preferably at about 5°C., by varying the rate of addition of the sodium nitrite solution.

Variations in the above described procedure may, of course, be utilized if so desired. Thus, for example, it is possible to introduce the sodium nitrate and acetic acid into reactor 1 through the same line as was previously used to affect the introduction of the glycine ester salt. Similarly, one may introduce the glycine ester as part of a solution containing the acetic acid and sodium acetate. And, if desired, reactor 1 may be a counterflow or plug reactor.

It is to be stressed, at this point, that the use of a solvent, such as ethylene dichloride, represents an essential element in the process of this invention since it is water immiscible and does not form an emulsion with the aqueous layer 6 or aqueous reaction medium containing the sodium nitrite as is the case with the solvent system usually employed in the above described batch-type process. Not only does the use of a solvent of this type result in higher yields, but is also facilitates the attainment of a safe, continuous process since it has a higher density and is, therefore, substantially entirely beneath the entire mass of the aqueous layer 6 comprising the aqueous solution of the glycine ester salt. This phenomenon thereby permits the diazoester, which dissolves in this solvent as it is formed, the latter solution comprising the organic layer 7, to be continuosly removed or extracted from reactor 1 through line 8 during the course of the reaction which thereby serves to substantially minimize the accumulated inventory of this hazardous intermediate.

Depending upon the capacity of reactor 1, it may be necessary to provide a drain or outlet port 8a for the accumulated aqueous layer 6. Thus, such a drain will be required only where the capacity of reactor 1 is insufficient to contain all of the aqueous layer which will accumulate in the period during which the reaction is being run.

Illustrative of the continuous nature of this process is the fact that during the simultaneous addition of the respective glycine ester and sodium nitrite solutions, the organic layer 7 is continuously removed while fresh ethylene dichloride solvent is being continuously recycled into reactor 1 via line 2 after first being condensed in condenser 15. At the same time, organic layer 7, comprising the solution of ethyl diazoacetate in ethylene dichloride, is slowly introduced through line 8 into reactor 9.

Another advantage of the novel process of this invention may be commented upon at this point. This advantage relates to the fact that there is no need to dry the ethyl diazoacetate with a drying agent, such as sodium carbonate, as is required in the conventional batch-type reaction process. Needless to say, this represents a considerable saving of time.

Rather than passing directly from reactor 1 into reactor 9, some or all of organic layer 7 containing the diazoester intermediate may, if desired, be introduced, through line 11, into a refrigerated storage vessel 10, which should be maintained at about 0°–50°C., and from which it may then be recycled, through line 11, into line 8 and thereafter slowly introduced into reactor 9.

Prior to the gradual introduction of the solution of the diazo intermediate into reactor 9, the latter reactor should first be charged with a fresh, finely powdered, copper bronze catalyst which is introduced through line 12, as well as with 2,5-dimethylhexadiene-2,4 which is continuously introduced through line 13. The 2,5-dimethylhexadiene-2-4, containing the copper bronze catalyst dispersed therein, should be vigorously agitated and heated to a temperature of from about 50° to 135°C. before initiating the gradual introduction of the diazoester solution.

After initiating the gradual introduction of the diazoester solution into reactor 9 which, as noted above, contains the agitated dimethyl hexadiene with the copper bronze catalyst dispersed therein, the temperature of the system should be maintained within the range of from about 50° to 135°C., and preferably at from about 100°–125°C., and this may be readily accomplished by controlling the addition rate of the diazoester and/or by applying external heat to reactor 9. During the ensuing coupling reaction between the diazoester intermediate and the dimethylhexadiene, substantial quantities of nitrogen gas will be evolved as a by-product which will be vented into the atmosphere through outlet valve 14 which is situated on line 2 at a point between reactor 1 and condenser 15. In addition, the ethylene dichloride, which comprised the solvent for the diazoester solution will be continuously distilled out at 83°–84°C. and may be recycled through line 2 and thereby returned into reactor 1.

Throughout the course of the reaction, the resulting crude reaction product is, preferably, continuously drained from reactor 9 through line 16 into distillation vessel 17 where it will be continuously distilled thereby removing any unreacted dimethylhexadiene through line 13 where it can be stored in storage vessel 18 and-/or immediately recycled back into reactor 9. Alternatively, a batch distillation of the crude reaction product may be conducted in reactor 9 since, at this point, such a procedure will not be hazardous.

In either the continuous distillation in distillation vessel 17 or a batch distillation in reactor 9, the fraction boiling at 43°–46° C. at 0.01mm Hg comprises the desired ethyl chrysanthemate which will be obtained in a yield of about 70–80 percent as based on the distilled product.

Many variations are, of course, possible in the above described procedure for carrying out the coupling reaction. Thus, for example, a semi-continuous operation could be employed whereby the addition of the glycine ester, the solution of sodium acetate and acetic acid and the sodium nitrite solution through lines 3, 4 and 5, respectively, is disrupted so as to permit the accumulation, in distillation vessel 17, of the ethyl chrysanthemate reaction product along with any unreacted dimethylhexadiene. Under these conditions, distillation vessel 17 can be used for the fractionation and purification of the dimethylhexadiene as well as of the reaction product.

The purity of the ethyl chrysanthemate reaction product may be evaluated by means of such procedures as infra-red, nuclear magnetic resonance and gas-liquid chromatographic analysis with the latter technique being found most convenient for detecting the presence of any undesirable components which may be present in the final product.

As produced by means of the above described process, the ethyl chrysanthemate is obtained as a mixture, containing the cis and trans isomer. This product is a colorless liquid having a specific gravity of about 0.924–0.927 g/cc at 25°C., a refractive index of from about 1.4560–1.4580 at 25°C. and a boiling point of 43°–46°C/0.01mm Hg or 78–81°C/4mm Hg.

With respect to the stoichiometry of the novel process of this invention, the reaction between the sodium nitrite or other alkali metal nitrite, and the hydrochloride salt of the ethyl ester of glycine leading to the preparation of the ethyl diazoacetate intermediate should be conducted with from about a 1 to 20 percent, and preferably about a 10 percent molar excess, of the sodium nitrite over the glycine ester. Thus, the use of a 40 percent molar excess of sodium nitrite is found to result in a substantially reduced yield of the diazoester while the use of an equimolar quantity of the sodium nitrite gives comparatively good yields. The mixture of sodium acetate and acetic acid, or other acid catalyst, need only be present in a catalytically effective concentration. The sodium acetate:acetic acid mixture should contain from about 0.1 to 10 percent, by weight, of acetic acid as based on the total weight of the mixture.

As for the coupling reaction between the 2,5-dimethyl hexadiene-2,4 and the ethyl diazoacetate leading to the preparation of the ethyl chrysanthemate, one should use from about a 10 to 1000 percent and, preferably a 300–600 percent, molar excess of the dimethylhexadiene with respect to the diazoester. The copper bronze, or other transition metal catalyst need, of course, be present in only a catalytically effective concentration.

As previously noted, ethyl chrysanthemate enjoys extensive usage as an intermediate for the synthesis of insecticides such, for example, as cinerin I, pyrethrin I, allethrin, barathrin, cyclethrin, ethythrin and furethrin. It may also be used as an intermediate for the synthesis of perfumes and pharmaceuticals.

The following example will further illustrate the embodiment of this invention. In this example all parts given are by weight unless otherwise noted.

EXAMPLE I

Into a 500 ml. jacketed, 3-neck flask (hereinafter referred to as flask No. 1) which is fitted with a mechanical stirrer, thermometer, dropping funnel and an outlet leading to another 500 ml 3-necked flask (hereinafter referred to as flask No. 2) equipped with a distilling head, thermometer and magnetic stirrer, there is introduced 150 g of ethylene dichloride which is then cooled to below 2°C. by means of ice water circulating through the jacket of the flask. Next, there is introduced, into flask No. 1, 29,5g of the hydrogen chloride salt of the ethyl ester of glycine dissolved in 27 ml of distilled water which also contains 2.4g of acetic acid and 0.38 of sodium acetate. The resulting mixture is then moderately stirred. Simultaneous with the addition, to Flask No. 1, of the glycine ester solution, an aqueous solution of 15.6g of sodium nitrite in 27 ml of distilled water is also added dropwise into flask No. 1. The temperature of the reaction system is maintained below about 5°C. by varying the rate at which the sodium nitrite and glycine ester solutions are introduced. The addition of these solutions requires about 15 minutes. During the addition of reagent or reagents, the organic layer is continuously removed and added dropwise into flask No. 2. Additional ethylene dichloride is added in order to replenish that which is being withdrawn.

Prior to the initiation of the above described reaction, there is introduced into flask No. 2, 80g of 2,5-dimethylhexadiene -2,4 and 10g of freshly powdered copper bronze catalyst and the resulting dispersion is heated to a temperature of about 110°C. while being vigorously agitated. The reaction intermediate which is being produced in flask No. 1, i.e., the ethylene dichloride solution of the ethyl diazoacetate intermediate, is continuously extracted and added dropwise into flask 2 which contains the heated, vigorously agitated dimethylhexadiene having the copper bronze catalyst dispersed therein. The temperature of the ensuing reaction is maintained between about 105°–110°C. by controlling the rate of addition of the solution of the diazoester intermediate. During the course of this reaction, nitrogen gas is evolved and vented into the atmosphere and ethylene dichloride is continuously distilled out and recycled into flask No. 1.

During the transfer, the diazoester solution is drained from flask No. 1 into flask No. 2, a step which requires about 15 minutes. The crude ethyl chrysanthemate reaction product is continuously drained into distillation equipment where the unreacted dimethylhexadiene is removed at about 70°C. under aspirator pressure and recycled back into flask No. 2.

The remaining crude product is distilled and the fraction boiling at 43°–46°C. at 0.01mm Hg comprised 32g, 80 percent yield based on the distilled product, of a colorless liquid having a specific gravity of from about 0.924 – 0.927 g/cc at 25°C., a refractive index of from about 1.4560 – 1.4580 at 25°C. and a boiling point of 43°–46°C./0.01mm Hg or 78°–81°C./4mm Hg. This product is a mixture of the cis and the trans isomer of ethyl chrysanthemate as shown by infra-red and nuclear magnetic resonance analysis.

The purity of this product is checked by means of gasliquid chromatography using an F & M Model 5750 (Hewlett-Packard) gas chromatography apparatus equipped with dual columns and a T.C. detector. This analysis is conducted using 6 feet × ⅛inches stainless steel columns packed with 10 percent SE-30 on Chromosorb W. The carrier gas is helium at 50 psi with the flowmeter set at 2.2. The sample size is one microliter, the injection temperature 280°C., the detector temperature 340°C., the column temperature is programmed from 50°C. at 15°C./min. to 300°C. and the retention time is 9 minutes.

Comparable results are achieved in the above described process when the n-butyl and n-octyl glycine esters are, in turn, substituted for the ethyl glycine ester

What is claimed is:

1. A process for preparing $C_1$-$C_{10}$ alkyl chrysanthemate esters which comprises:
   a. continuously preparing in a first reaction zone a solution of a $C_1$-$C_{10}$ alkyl diazoacetate in chlorinated solvent by the reaction, with agitation, of an aqueous mixture of an acid salt of a $C_1C_{10}$ alkyl ester of glycine and an alkali metal nitrite in the presence of an effective concentration of an acid catalyst and said solvent, wherein said solvent is selected from the group consisting of $C_1$-$C_2$ chlorinated alkanes immiscible with and denser than said aqueous mixture, at a temperature less than about 20°C., said alkali metal nitrite provided in an amount from about 1 to about 40 percent molar excess with respect to said acid salt of the $C_1$-$C_{10}$ alkyl ester of glycine;
   b. continuously removing the solution of $C_1$-$C_{10}$ alkyl diazoacetate in chlorinated solvent from the first reaction zone;
   c. admixing and reacting in a second reaction zone, the solution of $C_1$-$C_{10}$ alkyl diazoacetate in chlorinated solvent with a mixture containing 2,5-dimethyl-hexadiene-2,4 provided in an amount from about 10 percent to about 1000 percent molar excess with respect to said $C_1$-$C_{10}$ alkyl diazoacetate and an effective amount of a copper bronze catalyst maintained at a temperature between about 50° and about 135°C., with nitrogen being evolved as a gaseous by-product whereby $C_1$-$C_{10}$ alkyl chrysanthemate is produced;
   d. recovering $C_1$-$C_{10}$ alkyl chrysanthemate.

2. A process of claim 30 for preparing the $C_1$-$C_{10}$ alkyl chrysanthemate esters, said process comprising the steps of:
   a. first preparing a $C_1$-$C_{10}$ alkyl diazoacetate by simultaneously introducing an alkali metal nitrite and an acid salt of a $C_1$-$C_{10}$ alkyl ester of glycine into a first reaction vessel and thereupon reacting the latter reagents with each other in an aqueous reaction medium with said reaction being conducted in the presence of an effective concentration of an acid catalyst; the resulting $C_1$-$C_{10}$ alkyl diazoacetic dissolving, as it is formed, in an organic solvent selected from the group consisting of $C_1$-$C_2$ chlorinated alkane hydrocarbons which is contained within said first reaction vessel and which is immiscible with and denser than said aqueous reaction medium so that it does not form an emulsion therewith but is substantially entirely beneath said aqueous medium; wherein said alkali metal nitrite is present in a 1–20 percent molar excess with respect to said acid salt of the $C_1$-$C_{10}$ alkyl ester of glycine and said reaction is conducted under moderate agitation at a temperature of less than about 20°C.;
   b. continuously removing the organic solvent solution of the $C_1$-$C_{10}$ alkyl diazoacetate resulting from the reaction of step (a) from said first reaction vessel and introducing it into a second reaction vessel;
   c. admixing, in said second reaction vessel, the organic solvent solution of said $C_1$-$C_{10}$ alkyl diazoacetate resulting from the reaction of step (a) with 2,5-dimethyl-hexadiene-2,4 and reacting the latter two reagents with one another in said second reaction vessel in the presence of an effective concentration of a copper bronze catalyst with nitrogen being evolved as a gaseous by-product; wherein said 2,5-dimethyl-hexadiene-2,4 is present in a 10 to 1,000 percent molar excess with respect to said $C_1$-$C_{10}$ alkyl diazoacetate and said reaction is conducted under vigorous agitation and at a temperature of from about 50° to 135°C.;
   and
   d. recovering the $C_1$-$C_{10}$ alkyl chrysanthemate from the crude reaction product resulting from the reaction of step (c) by distilling said crude reaction product.

3. The process of claim 1, wherein said organic solvent is ethylene dichloride.

4. The process of claim 1, wherein said alkali metal nitrite is sodium nitrite.

5. The process of claim 1, wherein said acid salt of the $C_1$-$C_{10}$ alkyl ester of glycine is the hydrochloride salt.

6. The process of claim 1, wherein said alkali metal nitrite is present, in step (a), in a 10% molar excess.

7. The process of claim 1, wherein said acid catalyst comprises a mixture of acetic acid and sodium acetate.

8. The process of claim 1, wherein in step (c) said 2,5-dimethyl-hexadiene-2,4 is present in a 300 to 600 percent molar excess with respect to said $C_1$-$C_{10}$ alkyl diazoacetate.

9. The process of claim 1, wherein step (c) the organic solvent is continuously distilled off from the reaction mixture within said second reactor and recycled into said first reactor while any unreacted 2,5-dimethyl-hexadiene-2,4 remaining after said reaction is removed from said second reaction vessel, distilled and recycled into said second reactor.

10. The process of claim 1, wherein said $C_1$-$C_{10}$ alkyl ester of glycine is the ethyl ester of glycine.

11. A process for preparing ethyl chrysanthemate said process comprising the steps of:
   a. first preparing ethyl diazoacetate by simultaneously introducing an alkali metal nitrite and an acid salt of the ethyl ester of glycine into a first reaction vessel and thereupon reacting the latter reagents with each other in an aqueous reaction medium with said reaction being conducted in the presence of an effective concentration of an acid catalyst; the resulting ethyl diazoacetate dissolving, as it is formed, in an organic solvent selected from the group consisting of $C_1$-$C_2$ chlorinated alkane hydrocarbons which is contained within said first reaction vessel and which is immiscible and denser than said aqueous reaction medium so that it does not form an emulsion therewith but is substantially entirely beneath said aqueous medium; wherein said alkali metal nitrite is present in a 1 to 40 percent molar excess with respect to said acid salt of the ethyl ester of glycine and wherein the reaction is conducted under moderate agitation at a temperature of less than about 20°C.;
   b. continuously removing the organic solvent solution of the ethyl diazoacetate resulting from the reaction of step (a) from said first reaction vessel and introducing it into a second reaction vessel;
   c. continuously admixing, in said second reaction vessel, the organic solvent solution of ethyl diazoacetate resulting from the reaction of step (a) with 2,5-dimethyl-hexadiene-2,4 and reacting the latter two reagents with one another in said second reaction vessel in the presence of an effective concentration of a copper bronze catalyst with nitrogen being evolved as a gaseous by-product; wherein said 2,5-dimethyl-hexadiene-2,4 is present in a 10 to 1,000 percent molar excess with respect to said ethyl diazoacetate and the reaction is conducted under vigorous agitation and at a temperature of from about 50° to 135°C; and, a. recovering the ethyl chrysanthemate from the crude reaction production resulting from the reaction of step (c) by distilling said crude reaction product.

12. The process of claim 11, wherein said organic solvent is ethylene dichloride.

13. The process of claim 11, wherein said alkali metal nitrite is sodium nitrite.

14. The process of claim 11, wherein said acid salt of the ethyl ester of glycine is the hydrochloride salt.

15. The process of claim 11, wherein said alkali metal nitrite is present, in step (a), in a 10 percent molar excess.

16. The process of claim 11, wherein said acid catalyst comprises a mixture of acetic acid and sodium acetate.

17. The process of claim 11, wherein in step (c) said 2,5-dimethyl-hexadiene-2,4 is present in a 300 to 600 percent molar excess with respect to said ethyl diazoacetate.

18. The process of claim 11, wherein in step (c) the organic solvent is continuously distilled off from the reaction mixture within said second reactor and recycled into said first reactor while any unreacted 2,5-dimethyl-hexadiene-2,4 remaining after said reaction is removed from said second reaction vessel distilled and recycled into said second reactor.

* * * * *

UNITED STATES PATENT AND TRADEMARK OFFICE
CERTIFICATE OF CORRECTION

PATENT NO. : 3,897,478
DATED : July 29, 1975
INVENTOR(S) : Kyung S. Shim and Donald J. Martin It is certified that error appears in the above-identified patent and that said Letters Patent are hereby corrected as shown below:

<u>Column 6, line 1</u> change "29,5" to -- 29.5 --;

<u>Column 7, line 38 (Claim 2)</u> delete "30" and insert therefor -- 1 --;

<u>Column 7, line 48 (Claim 2)</u> change "diazoacetic" to
-- diazoacetate --;

<u>Column 9, line 12 (Claim 11)</u> change "a." to -- d. --.

Signed and Sealed this twentieth Day of April 1976

[SEAL]

Attest:

RUTH C. MASON
*Attesting Officer*

C. MARSHALL DANN
*Commissioner of Patents and Trademarks*